Oct. 18, 1949.   H. ALGER   2,485,251
JACKKNIFE PROOF SWIVEL COUPLING FOR
TRACTOR-TRAILER UNITS
Filed Oct. 25, 1946   3 Sheets-Sheet 1
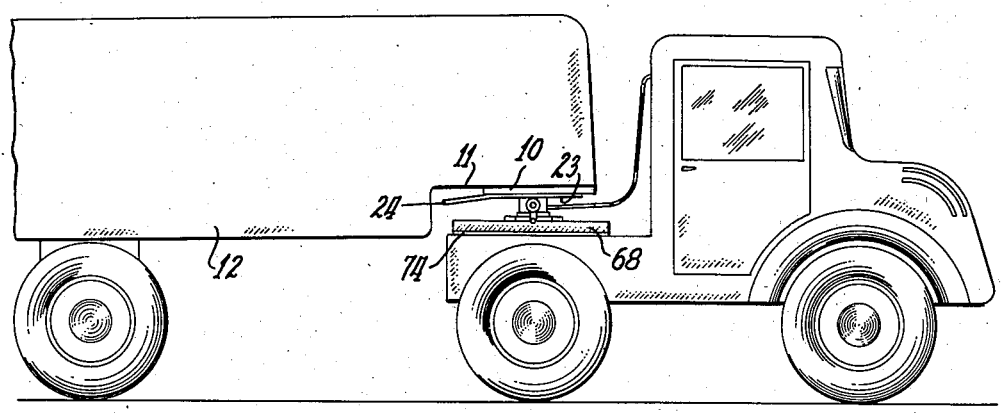
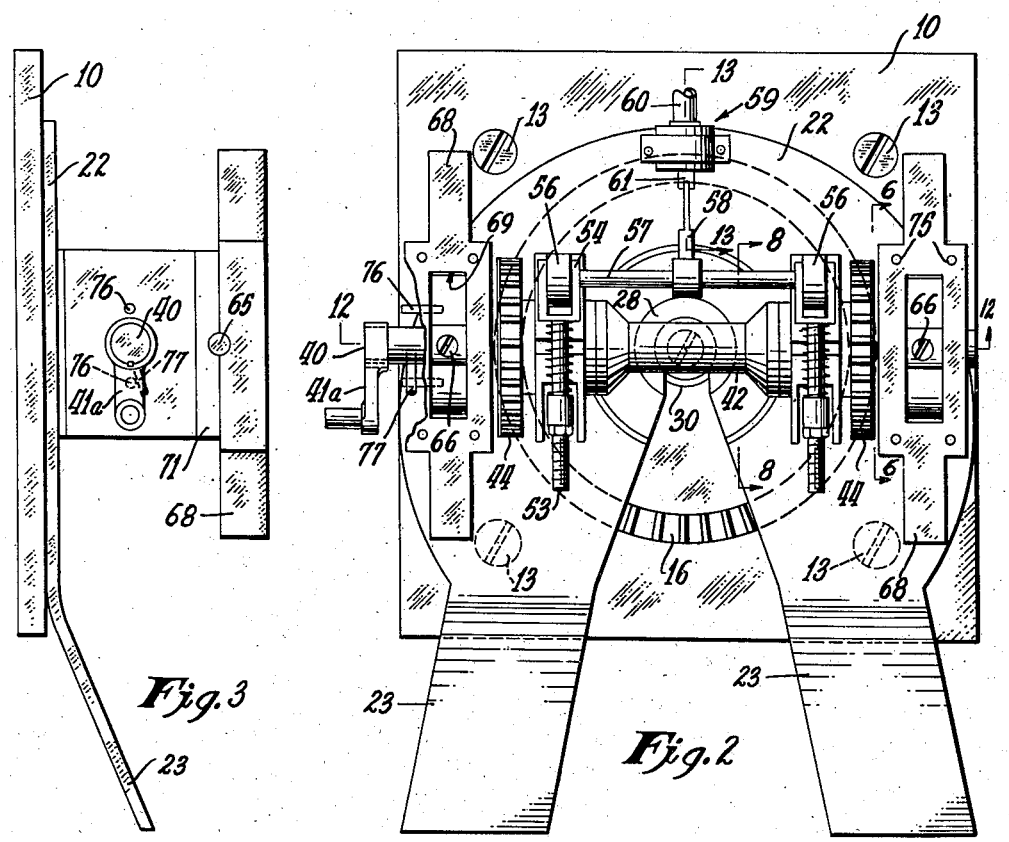
INVENTOR.
HARRY ALGER
BY J. Ledermann
ATTORNEY

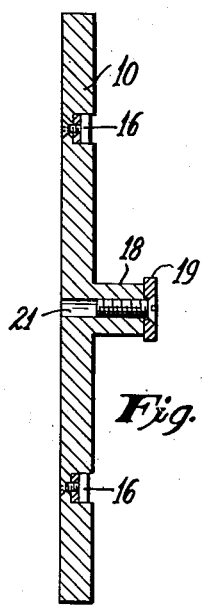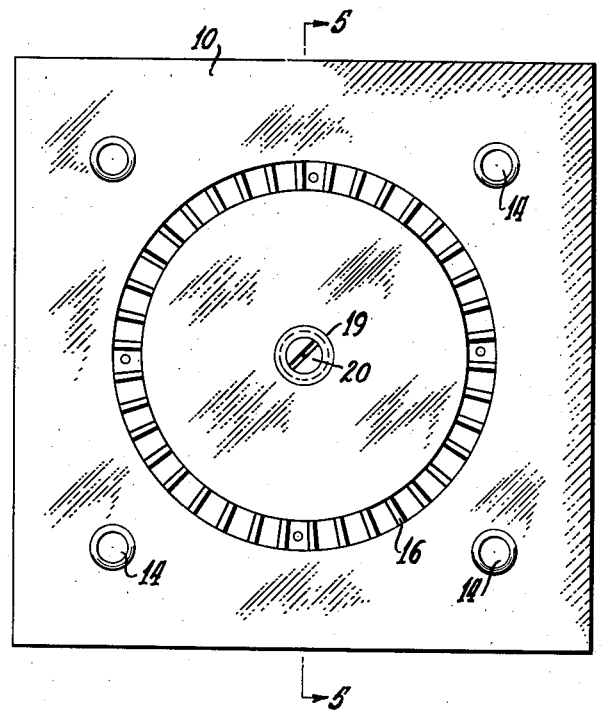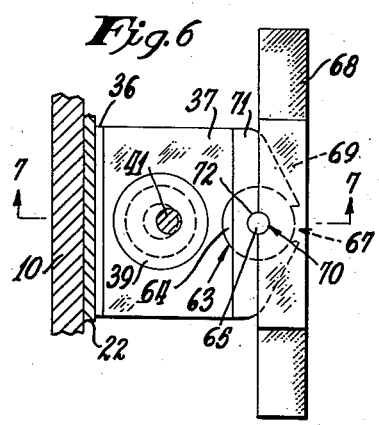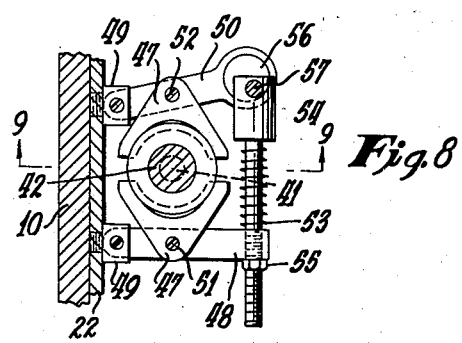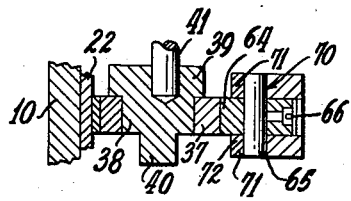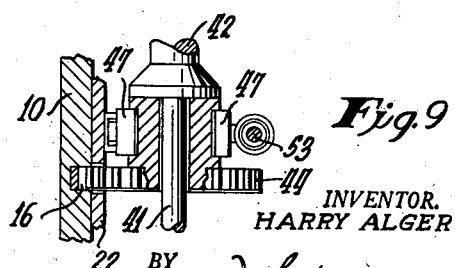

Oct. 18, 1949.

H. ALGER 2,485,251

JACKKNIFE PROOF SWIVEL COUPLING FOR
TRACTOR-TRAILER UNITS

Filed Oct. 25, 1946

INVENTOR.
HARRY ALGER

BY J. Ledermann

ATTORNEY

Patented Oct. 18, 1949

2,485,251

UNITED STATES PATENT OFFICE 2,485,251

JACKKNIFE PROOF SWIVEL COUPLING FOR TRACTOR-TRAILER UNITS

Harry Alger, Middletown, N. Y.; Anna H. Adams administratrix of said Harry Alger, deceased Application October 25, 1946, Serial No. 705,676

6 Claims. (Cl. 280—33.05)

1

This invention relates to combination tractor and trailer units, wherein a separable trailer truck is drawn by a tractor, and aims to provide novel, useful, and practical improvements in the swivel and its associated parts by means of which the trailer is detachably and pivotally connected or coupled to the tractor.

It is well known that accidents occur frequently in the operation of such units through the tendency of the trailer to jack-knife the tractor under certain conditions so that the driver is at a loss to control the vehicle. The main object of this invention is the provision of the above mentioned improvements in the swivel or coupling between the tractor and trailer, whereby jack-knifing of the unit is prevented in a positive manner.

The above broad as well as additional and more specific objects will become apparent in the following description, wherein characters of reference refer to like-numbered parts in the accompanying drawings. It is to be noted that the drawings are intended for the purpose of illustration only and that it is neither desired nor intended to limit the invention to any or all of the specific details of construction shown, excepting insofar as they may be deemed essential to the invention.

Referring briefly to the drawings,

Fig. 1 is a side elevational view of a trailer-truck combination or unit.

Fig. 2 is a bottom plan view of the swivel or coupling unit per se, of which part is fixed to the trailer and part to the tractor, with parts broken away to expose other parts.

Fig. 3 is a side view of Fig. 2, taken from the left hand side of the latter.

Fig. 4 is a bottom plan view of the plate which is fixed to the underside of the trailer, showing the annular rack thereof.

Fig. 5 is a sectional view taken on the line 5—5 of Fig. 4.

Fig. 6 is a sectional view taken on the line 6—6 of Fig. 2.

Fig. 7 is a sectional view taken on the line 7—7 of Fig. 6.

Fig. 8 is a sectional view taken on the line 8—8 of Fig. 2.

Fig. 9 is a sectional view taken on the line 9—9 of Fig. 8.

2

Figure 10:
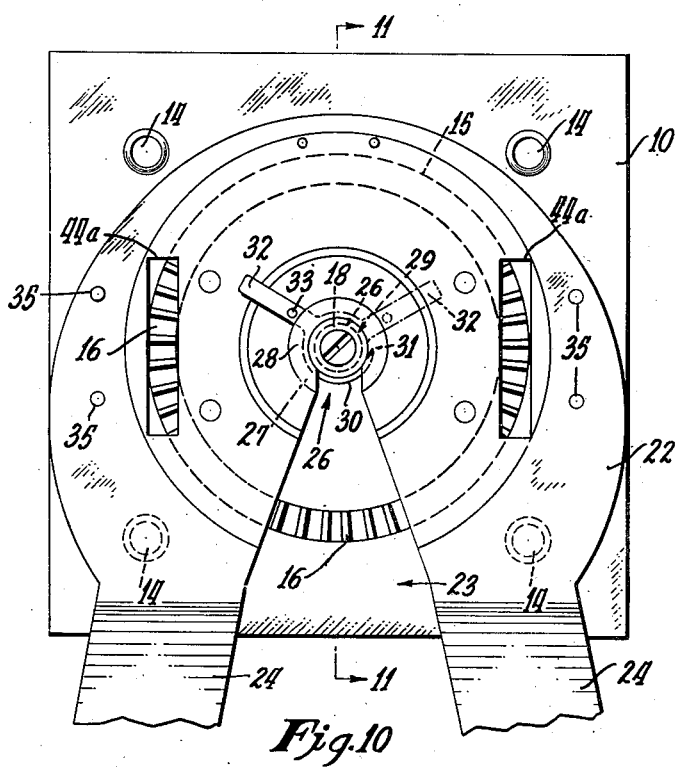
Fig. 10 is a bottom plan view of the forked swivel plate which is fixed to the trailer, omitting all other parts of the structure as shown in Fig. 2 to illustrate more clearly the interrelationship between the said two plates.
Figure 11:
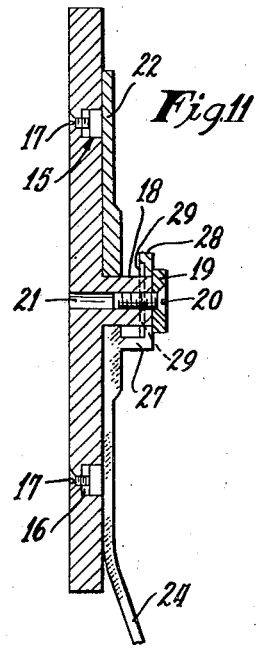

Fig. 11 is a sectional view taken on the line 11—11 of Fig. 10.

Figure 12:
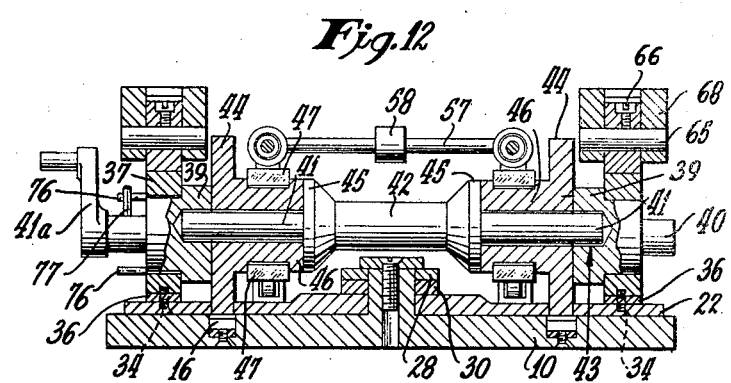

Fig. 12 is a sectional view taken on the line 12—12 of Fig. 2.

Figure 13:
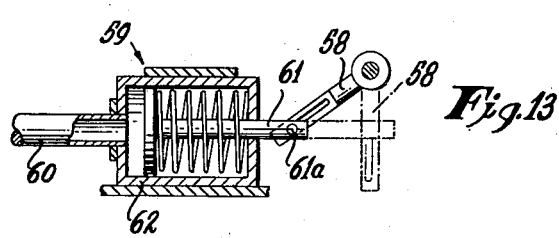

Fig. 13 is a sectional view taken on the line 13—13 of Fig. 2.

Referring in detail to the drawings, the numeral 10 indicates a plate which is secured against the forward underportion 11 of the trailer 12, as by means of screws 13 passing through holes 14 therein. This plate has on its exposed face an annular groove 15 in which an annular rack 16 is set and secured in any desired manner, as by screws 17, or, of course the rack teeth may be cut right into the plate or provided in any other manner or form than that illustrated. A hollow pin 18 is formed or provided in any desired manner, extending centrally from the plate 10, and having a flange or head 19 secured against the end of the pin by a screw 20 registering with the threaded opening 21 through the pin.

A second plate 22, which is circular or approximately so through a portion of its conformation, has a sector cut out thereof at 23 and on the sides thereof has downwardly bent flat arms 24 extending from the sides of the cut-out sector. At its center the plate 22 is provided with a half round or horseshoe-shaped cut-out 26 which is a continuation, or the central extremity, of the cut away sector 23. Vertical opposed walls 27 extend outward from the plate 22 on both sides and at the front or entrance into the cut-out 26, and support a horseshoe-shaped flange 28 parallel with the plate 22. A guide groove 29, concentric with the pin 18, is cut out of that side of the flange 28 which faces the plate 22. A split ring 30 having its free extremity 31 beveled and its other extremity provided with a radial handle 32, is rotatably mounted between the plate 22 and the flange 28 and registers in the groove 29 of the flange 28. The handle 32 is adapted to swing from the position shown in full lines in Fig. 10 to that shown in broken lines; in the former position the split ring 30 closes the opening into the cut-out 26, and in the latter position the cut-out of the ring aligns with the opening into the cut-out 26. It is obvious that in the former position of the ring the plate 22 is maintained in pivotal arrangement with respect to the plate 10.

Mounted on their edges on the plate 22, by means of screws 34 or the like passing through holes 35 in the plate 22, with spacers 36 therebetween, are parallel supports 37. Rotatably mounted in cylindrical openings through the supports 37 are cylinders or shafts 38 having enlarged extensions or bosses inward from the supports and reduced extensions 40 outward therefrom. The extremities 41 of a shaft 42 register rotatably in aligned sockets cut out of the bosses 39 but which are eccentric with respect to the common axis of the shafts 38. Gears 44 are rotatably mounted on the shaft extremities 41. On both sides of the middle of the shaft 42, flanges 45 are provided, against which the hubs 46 of the gears 44 contact slidably. The gears 44 are positioned in tangential alignment with the rack 16 and are thus maintained in position to mesh with the latter, by the flanges 45 and the bosses 39. Slots or cut-outs 44a are provided through the plate 22 through which the gears 44 have access to the rack 16. It is apparent that the rotation of the shaft 42 through an arc will bring the gears 44 into mesh with the rack, and vice versa. To facilitate such rotation of the shaft 42, a crank 41a may be provided on one of the reduced extensions 40 of the shaft 42. When the crank is swung to turn the adjacent boss 39 on its axis (Fig. 12), the shaft 42 owing to its eccentricity with respect to the said axis will be swung through an arc, and the right-hand end 41 of the shaft 42 will owing to its eccentricity in the right-hand boss 39 cause the latter to swing synchronously with the left-hand boss 39. Thus the gears 44 will be lowered into or raised out of engagement with the rack 16.

Braking means for locking the shaft 42 are provided as follows. Opposed jaws 47 are provided adjacent and partially encircling both gear hubs 46. For each hub 46, on one side of the hub, a link 48 is pivoted at one end to an ear 49 secured to the plate 22, and intermediate its length at 51 the link is pivoted to the adjacent jaw 47. A rod 53 extends through an opening in the free end of the link 48 and has threads on one end to accommodate a nut 55 for obvious reasons. On the other end is a forked head 54. On the free end of the link 50 is an enlarged disc-shaped head 56 which registers between the forks of the head 54. A tie rod 57, extending parallel with the shaft 42, has its extremities anchored eccentrically in the disc-heads 56. A crank arm 58 extends rigidly from the middle of the rod 57. It is apparent from Fig. 8 that arcuate rotation of the tie rod 57 in one direction will bring both sets of jaws 47 against the gear hubs, and vice-versa.

The crank arm 58 is slotted and in engagement by means of a pin 61a with the rod 61 of an air brake diaphragm housing 59 secured against the plate 22, the air hose leading thereto being shown at 60. The housing 59 is represented diagrammatically merely to illustrate its purpose in the combination, and it is apparent that when air enters the housing the piston 62 is pushed back to expel the rod 61 and thus swing the crank 58 downward (Fig. 13), thereby locking the brake jaws on the gear hubs. The air brake lever for this purpose would of course be located adjacent and handy to the driver.

The outer ends of the supports 37 are provided with aligned cylindrical cut-outs 63 in which cylindrical shafts or rockers 64 register pivotally. Pins 65 extend axially through the rockers 64 and are locked rigid therewith by set screws 66 inserted through the openings 67 into the cut-outs 63. Frame members 68 provided with slots 69 therethrough of substantially the width of the supports 37, each have aligned semi-circular cut-outs 70 in one edge thereof, and additional support members 71 on the sides of the support 37 have complementary semi-circular cut-outs 72 in one edge thereof. The members 68 and 71 are brought together with the pins 65 passing through the complementary cut-outs 70—72, and they are held in that position by screws 73. A plate 74, shown only in Fig. 1, is attached to the members 68 by passing screws, not shown, therethrough and through holes 75 in these members.

When the tractor and trailer are separated, only the plate 10 as shown in Figs. 4 and 5, is attached to the trailer, as previously set forth, and all the rest of the structure shown in Fig. 2 is attached to the plate 22, as also previously set forth. The open end of the forked plate 22 extends outward from the rear of the tractor; so that the two may be coupled together by backing the tractor into the trailer, in proper alignment, with the pin 18 registering in the cut-out 26 while the split-ring is in the open position, after which the ring is swung to the closed position, as mentioned. Also, while this is being done, the crank is in the position shown in Fig. 12, so that the gears 44 are out of mesh with the rack 16. After the coupling has been made, the crank is turned through approximately 180 degrees, thus meshing the gears 44 with the rack, and then as the tractor turns out of a straight line on the road, the two gears will ride through and along the rack 16, assuming, of course, that the brakes 47 are unlocked. Among other conditions, it is when such a unit is traveling with a heavy load on slippery pavement, that the tendency of jack-knifing, as mentioned is apt to occur. Application of the brakes 47 to lock the hubs 46 and hence to prevent rotation of the gears 44, prevents swiveling of the trailer with respect to the truck and necessitates its traveling the exact path of the truck, thereby eliminating all danger of such jack-knifing. Limit stops to rotation of the shaft 42, and hence indicia to the two extreme positions of the crank 41a, may be provided in the form of the two spaced pins 76 adapted to serve as stops for the pin 77 rigid with the crank shaft 41.

Obviously, modifications in form and structure may be made without departing from the spirit and scope of the invention.

I claim:

1. In combination with a trailer and a tractor, a swivel having a part thereof on said trailer and the remaining part thereof on said tractor thereby pivotally connecting said tractor with said trailer, and releasable means for rigidly interlocking said parts of said swivel to restrain said trailer and tractor from pivotal movement with respect to each other, said means comprising a horizontal annular rack on said trailer part of said swivel, said tractor part of said swivel having a horizontal shaft thereon having spaced gears rotatably mounted on the shaft, the distance between said gears being equal to the diameter of said rack, means for moving said shaft toward or away from said trailer part of said swivel to mesh or disengage, respectively, said gears with said rack, and means for locking said gears against rotation.

2. In combination with a trailer and a tractor, a swivel having a part thereof on said trailer and the remaining part thereof on said tractor thereby pivotally connecting said tractor with said trailer, and releasable means for rigidly interlocking said parts of said swivel to restrain said trailer and tractor from pivotal movement with respect to each other, said means comprising a horizontal annular rack on said trailer part of said swivel, said tractor part of said swivel having a horizontal shaft thereon, spaced gears rotatably mounted on said shaft, the distance between said gears being equal to the diameter of said rack, supports mounted on said tractor part of said swivel adjacent the ends of said shaft, stub shafts rotatably mounted in said supports and having aligned eccentric sockets therein, said ends of said first shaft registering in said sockets, means for rotating one of said stub shafts through an arc in one direction thereby moving said first shaft toward said trailer part to mesh said gears with said rack and in the opposite direction thereby moving said first shaft away from said trailer part to disengage said gears from said rack, and means for locking said gears against rotation.

3. In combination with a trailer and a tractor, means for pivotally connecting said tractor with said trailer comprising a horizontal plate secured to the underside of said trailer and having a pin projecting from substantially the center of the underside thereof, the underside of said plate having an annular rack thereon concentric with said pin, spaced frame members secured to an upwardly-facing portion of said tractor, supports extending upward from said frame members and having stub shafts rotatably mounted therein, said stub shafts having eccentric aligned sockets therein in the juxtaposed ends thereof, a shaft having its extremities registering in said sockets, spaced gears rotatably mounted on said last shaft, the distance between said gears being equal to the diameter of said rack, a second plate secured to the upper ends of said supports, said second plate having fork arms extending therefrom and having a cut-out extending from the space between said arms to substantially the center of said second plate with the extremity of said cut-out at said center horseshoe-shaped and of a width permitting registration of said pin therein, said second plate having slots cut therethrough tangential to said gears to permit movement of the edges of said gears therethrough, means for releasably locking said pin in said extremity of said recess thereby pivotally connecting said plates, means for rotating one of said stub shafts through an arc in one direction thereby raising said last shaft and moving said gears part way through said slots to mesh with said rack and in the other direction for lowering said last shaft thereby moving said gears out of mesh with said rack, and means for releasably locking said gears against rotation.

4. In combination with a trailer and a tractor, a swivel having a part thereof on said trailer and the remaining part thereof on said tractor thereby pivotally connecting said tractor with said trailer, and releasable means for rigidly interlocking said parts of said swivel to restrain said trailer and tractor from pivotal movement with respect to each other, said means comprising a horizontal annular rack on said trailer part of said swivel, said tractor part of said swivel having a horizontal shaft thereon, having spaced gears rotatably mounted on the shaft, the distance between said gears being equal to the diameter of said rack, supports mounted on said tractor part of said swivel adjacent the ends of said shaft, stub shafts rotatably mounted in said supports, said ends of said first shaft being eccentrically secured to said stub shafts, means for rotating one of said stub shafts through an arc in one direction thereby moving said first shaft toward said trailer part to mesh said gears with said rack and in the opposite direction thereby moving said first shaft away from said trailer part to disengage said gears from said rack, and means for locking said gears against rotation.

5. The combination set forth in claim 3, said supports being pivotally secured to said frame members.

6. The combination set forth in claim 3, said supports being pivotally secured to said frame members, said fork arms curving downward from said second plate.

HARRY ALGER.

REFERENCES CITED

The following references are of record in the file of this patent:

UNITED STATES PATENTS

| Number | Name | Date |
|---|---|---|
| 1,078,801 | Munsing | Nov. 18, 1913 |
| 1,928,855 | Hamlin | Oct. 3, 1933 |
| 2,157,792 | Koonce | May 9, 1939 |
| 2,213,221 | Johnson | Sept. 3, 1940 |